United States Patent
Cipolla et al.

(10) Patent No.: US 6,247,816 B1
(45) Date of Patent: *Jun. 19, 2001

(54) OPTICAL SYSTEM FOR PROJECTION DISPLAYS USING SPATIAL LIGHT MODULATORS

(75) Inventors: Thomas Mario Cipolla; Fuad Elias Doany, both of Katonah; Robert Lee Melcher, Mount Kisco, all of NY (US); Rama Nand Singh, Bethel, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,395

(22) Filed: Aug. 7, 1997

(51) Int. Cl.[7] ................................................. G03B 21/14
(52) U.S. Cl. ................................. 353/31; 353/69; 353/20
(58) Field of Search .............................. 353/31, 33, 34, 353/37, 69, 70, 20, 82; 359/622; 349/8, 9

(56) References Cited

U.S. PATENT DOCUMENTS

| | | | |
|---|---|---|---|
| 2,747,460 | * 5/1956 | Calvi | 353/38 |
| 4,728,185 | * 3/1988 | Thomas | 353/122 |
| 4,836,649 | * 6/1989 | Ledebuhr et al. | 353/31 |
| 4,850,685 | * 7/1989 | Kamakura et al. | 353/31 |
| 5,032,022 | * 7/1991 | Sato et al. | 353/69 |
| 5,365,287 | * 11/1994 | Vollmer et al. | 353/31 |
| 5,374,968 | * 12/1994 | Haven et al. | 353/31 |
| 5,442,413 | * 8/1995 | Tejima et al. | 353/69 |
| 5,512,967 | * 4/1996 | Bohannon | 353/31 |
| 5,575,548 | * 11/1996 | Lee | 353/31 |
| 5,577,826 | * 11/1996 | Kasama et al. | 353/31 |
| 5,597,222 | * 1/1997 | Doany et al. | 353/33 |
| 5,621,486 | * 4/1997 | Doany et al. | 348/756 |
| 5,626,409 | * 5/1997 | Nakayama et al. | 353/31 |
| 5,695,266 | * 12/1997 | Kida et al. | 353/31 |
| 6,010,221 | * 1/2000 | Maki et al. | 353/33 |
| 6,034,818 | * 3/2000 | Sedmayr | 359/497 |

FOREIGN PATENT DOCUMENTS

| | | |
|---|---|---|
| 6-82723 | 3/1994 | (JP) . |
| 8-201756 | 8/1996 | (JP) . |

* cited by examiner

*Primary Examiner*—William Dowling
(74) *Attorney, Agent, or Firm*—Scully, Scott, Murphy & Presser; Daniel P. Morris

(57) ABSTRACT

An optical system for a projection display employing three reflective spatial light modulations (SLM's) is described. Two or the three SLM imaging paths employ typical image combining and projection optical techniques. However, the third SLM imaging path employs a relay lens to produce an intermediate image of the SLM which is subsequently combined with the other two images. Each color component is directed onto one of three SLM's, each through its own polarizing beamsplitter (PBS) cube. In two of the three SLM's, image forming light is reflected from each SLM and passes through its respective PBS, and the two colors are then recombined using a dichroic coating. A lens then images the two-color image, and projects it onto a screens. The third SLM traverses a completely separate path. In this case, the image forming light reflected by the SLM and passing through the PBS is first imaged by a relay lens of approximately unity magnification to produce an intermediate image plane. This intermediate image (of the third colors SLM) is then recombined with the first two color images using PBS or a dichroic coating. The recombination is accomplished in a manner that ensures that the three color images are located at the back focal distance of the projection lens.

10 Claims, 2 Drawing Sheets

OPTICAL SYSTEM FOR PROJECTION DISPLAYS USING SPATIAL LIGHT MODULATORS

BACKGROUND OF THE INVENTION

1. Field of the Invention

The present invention is directed to optical systems for projection displays, and more particularly, to optical systems employing spatial light modulators for forming a plurality of color images having additional optics for improved color convergence.

2. Description of the Prior Art

Optical systems for projection displays employing a plurality of spatial light modulators are known in the art. Generally, three spatial light modulators are used to form three color components of an image, typically, red, green and blue components. Light is first separated into the three colors, which are in turn projected onto a respective SLM to form the three color components of an image. The three color components are recombined and projected onto a screen. The three color images must be converged properly to produce a high quality projected image. In the known prior art systems, color convergence is not good at the corners of the screen and therefore the image quality is less than perfect. In addition, the prior art systems have the problem of polarization due to birefringence in the imaging path.

SUMMARY OF THE INVENTION

An optical system for a projection display employing three reflective spatial light modulators (SLM's) is described. Two of the three SLM imaging paths employ typical image combining and projection optical techniques. However, the third SLM imaging path employs a relay lens to produce an intermediate image of the SLM which is subsequently combined with the other two images. This approach has many advantages for high performance projection displays including high contrast, high optical efficiency, and in particular, enabling better color convergence.

White light from an arc lamp is separated within the illumination system into the three color components red (R), green (G) and blue (B). Each color component is directed onto one of three SLM's, each through its own polarizing beamsplitter (PBS) cube. In two of the three SLM's, image forming light is reflected from each SLM and passes through its respective PBS, and the two colors are then recombined using a dichroic coating. A lens then images the two-color image, and projects it onto a screen.

The third SLM, however, traverses a completely separate path. In this case, the image forming light reflected by that SLM and passing through the PBS is first imaged by a relay lens of approximately unity magnification to produce an intermediate image plane. This intermediate image (of the third color SLM) is then recombined with the first two color images using PBS or dichroic coating. The recombination is accomplished in a manner that ensures that the three color images are formed at the back focal distance of the projection lens. The full three-color image projected by the lens is thus comprised of two real SLM's and an intermediate image of the third SLM produced by the relay lens.

DETAILED DESCRIPTION OF THE INVENTION

Figure 1:
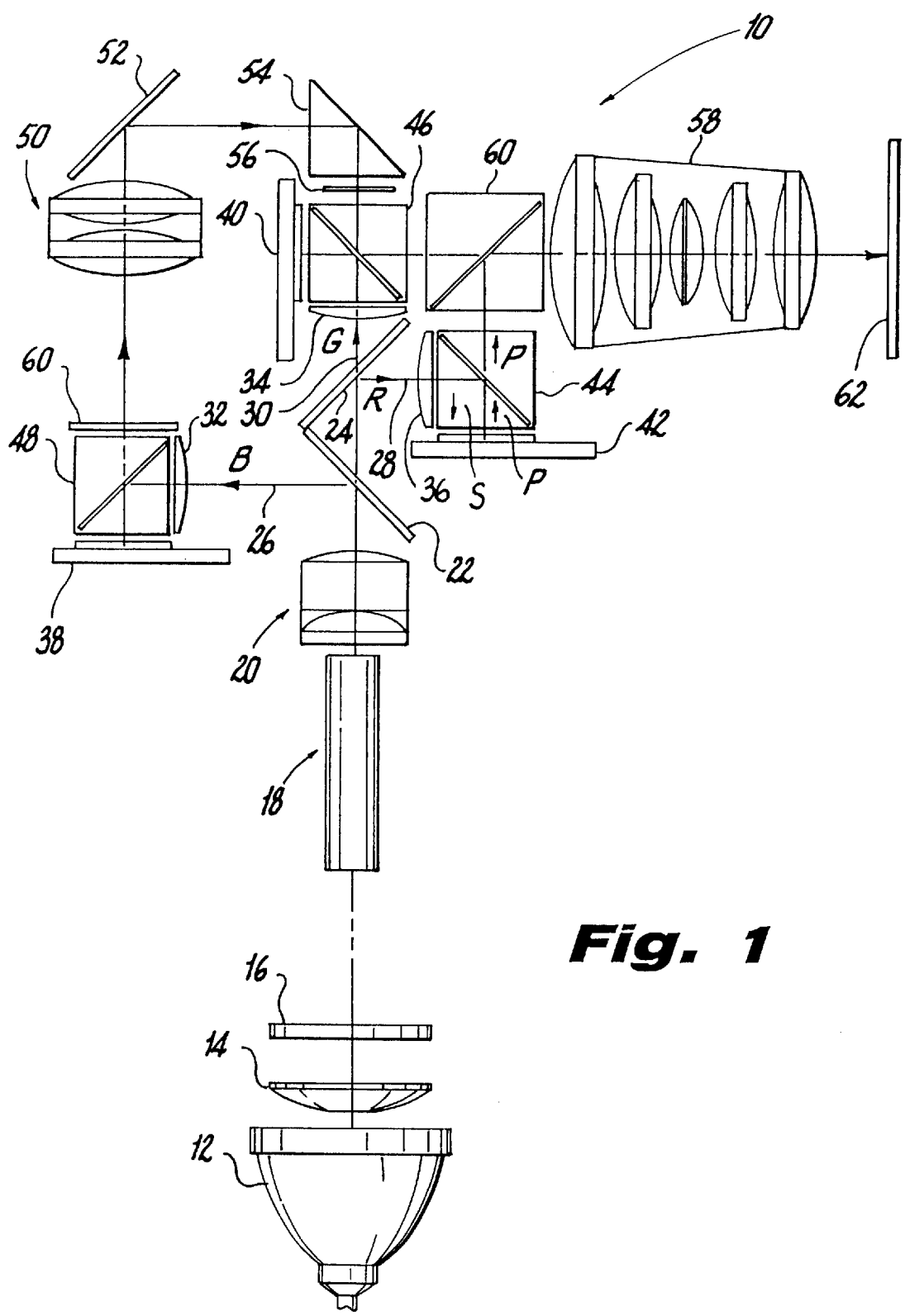
FIG. 1 is schematic diagram of one embodiment of the projection apparatus of the present invention.

The preferred embodiment of the optical system of the projection apparatus of the present invention is schematically shown in FIG. 1. The projection apparatus 10 includes color-separation optics, the image-forming and combining optics for the first two SLM's, the image-forming and combining optics for the third SLM which includes a relay lens, and the final projection lens. Although several possible assignments for the red, green and blue SLM's are possible, the preferred embodiment in FIG. 1 assigns blue to the third channel which includes the relay lens, and red and green to the first two SLM's. The SLM's in this embodiment are reflective liquid crystal arrays that function by selectively rotating the polarization of the incident light. A more detailed description of the various subsystems follows.

The apparatus 10 includes white light source 12, such as a metal halide arc lamp, with a parabolic or ellipsoidal reflector or condenser lens 14 for efficient light collection. One or more 16 filters for removing ultraviolet and infrared light are also provided in the illumination path 17.

The apparatus also includes light homogenization optics, such as a light tunnel or a fly's eye lens system. In FIG. 1, a light tunnel homogenizer 18 is depicted. Following the light tunnel 18 is a relay lens 20 which focuses the white light output to dichroic color splitters 22, 24. In FIG. 1, the first dichroic splitter 22 reflects the blue light into path 26 and transmits the red and green light components. The second dichroic splitter 24 reflects the red light into paths 28 and transmits the green light into path 30. Three individual single-dolor field lenses 32, 34, 36 are used to image the uniform light output onto the three SLM's 38, 40 and 42.

The red and green color components are used to illuminate SLM's 42 and 40, respectively. The illumination optics may also include polarizing elements (not shown) to ensure that s-polarized light is directed to the SLM's.

For the red SLM 42, a polarizing beamsplitter cube (PBS) 44 reflects the s-polarized light onto the red SLM 42. Similarly, for the green SLM 40, a second PBS 46 reflects the green s-polarized light onto the green SLM 44.

The SLM's function is to selectively rotate the s-polarization of the incident light to image-forming p-polarized light. An image is formed when light reflected by the SLM is separated into s- and p-polarization components by the PBS. The PBS will reflect the original s-polarization and transmit the image-forming p-polarization. Both the red and green channels operate in this manner.

The third SLM 38 is used for the blue light. The s-polarized blue light is directed to the blue SLM 38 through a PBS 48 in a similar manner used in the other two colors. Similarly, p-polarized image-forming light is reflected by the SLM 38 and transmitted by the PBS 48 as in the other two SLM's.

A relay lens 50 is then used to form an intermediate image of the SLM 38.

Using two reflectors, a front-surface mirror 52 and a right-angle prism 54, the intermediate image is directed and focused onto a plane 56 adjacent to the surface of the green PBS 46. This plane is located at the back focal distance of the projection lens 58. By an intermediate image, it is meant herein that the image is transmitted through a means for providing some optical enhancement, such as magnification or focusing. In the embodiment of FIG. 1, the means is a relay lens.

A half-wave (λ/2) retardation film 60 placed between the blue PBS 48 and the intermediate image plane 56 is used to rotate the p-polarized image-forming blue light to s-polarization.

The s-polarized blue light is then recombined with the green (p-polarized) image-forming light using the green SLM PBS 46. That is, p-polarized light from the green SLM 40 passes through the PBS 46 while s-polarized light from the intermediate blue image 56 is reflected by the PBS 46.

A dichroic color combining prism or plate 64 is then used to combine the red, green and blue images. The dichroic coating reflects the red light incident from the red PBS 44 and transmits the green and blue light incident from the green PBS 46. The combined red, green and blue images are directed to the projection lens 58.

An alternate approach for recombining the blue and green images, rather than using the polarizing coating of the green PBS, is to use a separate dichroic coating (not shown). The dichroic coating is designed to transmit green light while reflecting blue light. This dichroic combiner can be incorporated into the green PBS. The green PBS coating first contains the polarizing coating (along the diagonal adjacent to the green SLM) followed by the blue/green dichroic combiner (adjacent to the image of the blue SLM).

The recombined three-color image of the SLM's is then imaged onto a rear or front projection screen 62 using the projection lens 58. The red and green SLM's, as well as the intermediate image of the blue SLM, are each located at the back focal distance of the projection lens 58.

Figure 2:
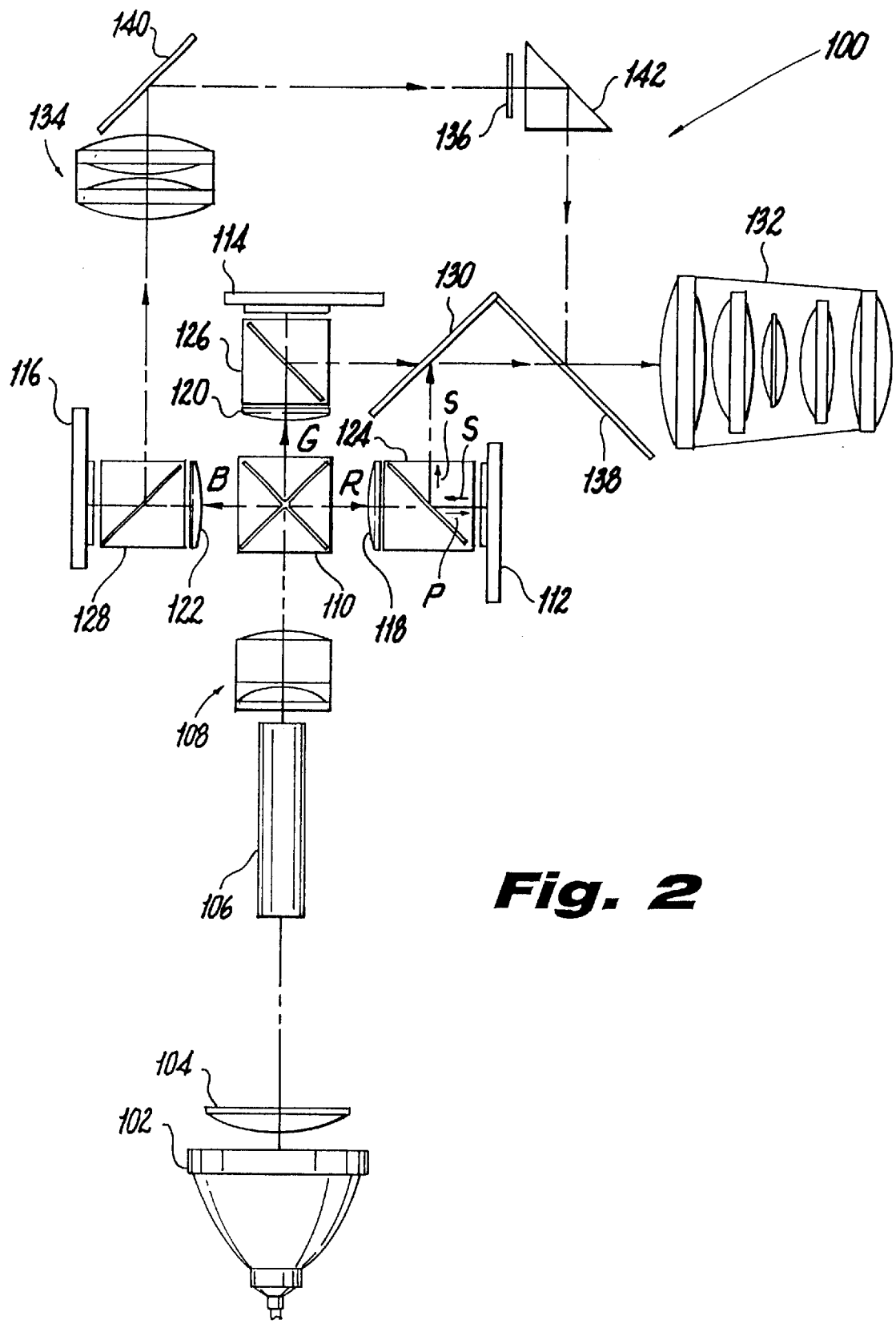
FIG. 2 is a schematic diagram of a second embodiment of the projection apparatus of the present invention.

A second embodiment of an optical system that incorporates a relay lens with near unity magnification is schematically shown in FIG. 2. In the second embodiment, the illumination system 100 is comprised of an arc lamp 102, condenser lens 104, light tunnel homogenizer 106 and illumination relay lens 108 similar to the system described in the preferred embodiment shown in FIG. 1. In FIG. 2, the illumination color splitting into the red (R), green (G) and blue (B) components is accomplished in a crossed dichroic arrangement 110. This may be a set for four prisms assembled together to form a crossed dichroic cube or two plates assembled to form a crossed plate. The three color components are then directed to the three SLM's, 112, 114, 116 through three individual field lenses 118, 120, 122 and PBS cubes 124, 126, 128. For two of the three SLM's, image forming light reflected by the SLM's is also reflected by the PBS cubes and is subsequently recombined using a dichroic plate 130 (or cube) and directed toward the projection lens 132. In FIG. 2, these first two channels are assigned to green and red, similar to the assignment used in the first embodiment in FIG. 1. In the third channel, the image forming light reflected by the SLM and the PBS is directed through a lens 134. The relay lens produces an intermediate image 136 of the third SLM focused at the back focal distance of the projection lens 132. This image is then recombined with light from the first two SLM's in second dichroic combining plate 138 (or cube) and directed to the projection lens 132. In this embodiment, the intermediate image 136 is directed to the back focal distance of lens 132 using mirror 140. The intermediate image 136 is then directed to the combiner 138 by right angle prism 142.

The primary differences in the embodiment of FIG. 2 compared to the embodiment of FIG. 1 are:

The crossed dichroic arrangement 110 for separation of the illumination light into the three color components R, G and B.

The polarizing beamsplitter (PBS) cubes 124, 126, 128 are used in transmission for the illumination and in reflection for imaging by the projection lens. That is, p-polarization is used for illumination while s-polarization is used for imaging of the SLM's.

The final image combining of the three colors is accomplished by two dichroic plated 130, 138 (or cubes). The first plate 130 combines the light from the green and red SLM's 114, 112, and the second plate 138 combiness the red/green light with the blue light. This arrangement results in longer retrofocus distance for the projection lens 132.

Additional embodiments are also possible that incorporate some of the above subsystems in any combination. These interchangeable subsystems are the cross-dichroic illumination instead of two individual plate dichroic color separators, s-polarized imaging instead of p-polarized imaging, and two individual dichroic color combining plates or cubes instead of one dichroic combiner used in conjunction with a PBS combiner.

The optical system described above provides enhanced optical performance for high resolution projection displays based on three reflective spatial light modulators. Color convergence is a major advantage of the system of the invention. The use of a relay lens in the blue channel can directly address the color misconvergence problems of typical optical systems. A relay lens with slight magnification (<1%) enables a slight magnification correction for the blue channel relative to the red/green channels. By optimizing the magnification of the blue relay lens in conjunction with the projection lens performance, greatly improved color convergence can be attained in the final image. Other, areas of improved performance include:

Contrast is greatly enhanced by minimizing the glass path that requires low birefringence material. Only the first half of the polarizing beamsplitter cube need be fabricated from low birefringence glass. Once the image-forming light passes through the PBS coating, the birefringence of the remaining glass is irrelevant to the contrast.

Color efficiency is improved by separating the color splitting optics from the color recombing optics. The coatings of the color splitting and color combing optics can be optimized separately.

Throughput is also improved by using all right angle splitting/combining optics thus eliminating stray light scattering from one channel into others ("cross-talk").

The retrofocus distance of the projection lens is also reduced compared to typical optical configurations that image the three SLM's directly through all the color combing optics.

The short retrofocus distance also facilitates the use of higher numerical aperture optics. Such optics also improve the throughput since it is limited by lamp brightness in most applications.

In summary, the present invention is directed to a projection apparatus comprising means for forming an intermediate image of a spatial light modulator and means for projection said intermediate image onto a screen. The projection apparatus further comprises means for projecting a plurality of color images onto a screen and means for correcting at least one of said color images for magnification and residual chromatic aberration. The relay lenses 50 and 134 of FIGS. 1 and 2 make these corrections.

The projection apparatus of the invention for projecting a plurality of color images comprises a source of the plurality of colors, means for projecting each of the plurality of colors onto a spatial light modulator corresponding to each of said colors, means for combining each of the color images into a composite image in an image recombining path, means for eliminating polarization disruption due to a birefringence in the image recombining path, and means for providing contrast.

While several embodiments and variations of the present invention for an optical system for projection displays are described in detail herein, it should be apparent that the disclosure and teaching of the present invention will suggest many alternative designs to those skilled in the art.

Having thus described our invention, what we claim as new and desire to secure by Letters Patent is:

1. A projection apparatus comprising:
   means for forming an intermediate image of a first spatial light modulator, using light from the modulator, and to correct said image for magnification and residual chromatic aberrations;
   means for projecting said intermediate image onto a screen; and
   means to rotate the polarizing of the light from the modulator, prior to the means for projecting, to reverse polarization changes caused by the spatial light modulator in the image path.

2. The projection apparatus of claim 1, wherein said means for forming an intermediate image includes a relay lens.

3. The projection apparatus of claim 2, wherein said means for forming an intermediate image includes means for forming said intermediate image at a back focal distance of a projection lens of said means for projecting said image onto a screen.

4. The projection apparatus of claim 2, further including at least a second spatial light modulator, and means for projection an image from said at least a second spatial light modulator onto said screen.

5. The projection apparatus of claim 4, further including means for combining said image from said at least second spatial light modulator with said intermediate image before each of said images are projected onto said screen.

6. The projection apparatus of claim 4, wherein said at least second spatial light modulator forms an image at a back focal distance of said projection lens.

7. The projection apparatus of claim 5, wherein said combining means includes a polarizing beam splitter and a dichroic color combiner.

8. A projection apparatus comprising:
   a source of a plurality of colors;
   means for individually protecting each of said colors onto a spatial light modulator corresponding to each color for forming a plurality of color images;
   means for forming an intermediate image of at least one of said color images and to correct said at least one of said images for magnification and residual chromatic aberrations;
   means for combining said at least one intermediate image with the remaining of said plurality of color images to form a composite image in an image recombining path;
   means to rotate the polarization of said at least one of the color images, prior to the combining means, to reverse polarization changes caused by the spatial light modulator in the path of said at least one of the color images and to facilitate combining the color images; and
   means for projecting said composite image onto a screen.

9. The projection apparatus of claim 8, wherein said means for forming an intermediate image includes means for correcting said at least one of said color images for magnification and residual chromatic aberration.

10. The projection of claim 8, further including means for providing contrast.

* * * * *